(12) United States Patent
Zhu (10) Patent No.: US 11,739,687 B2
(45) Date of Patent: Aug. 29, 2023

(54) ENGINE (71) Applicant: Xiaoyi Zhu, Shenzhen (CN)

(72) Inventor: Xiaoyi Zhu, Shenzhen (CN)

( * ) Notice: Subject to any disclaimer, the term of this patent is extended or adjusted under 35 U.S.C. 154(b) by 0 days.

(21) Appl. No.: 17/373,816

(22) Filed: Jul. 13, 2021

(65) Prior Publication Data
US 2021/0340909 A1 Nov. 4, 2021

Related U.S. Application Data (63) Continuation of application No. 15/800,394, filed on Nov. 1, 2017, now Pat. No. 11,098,642.

(51) Int. Cl.
*F02C 3/32* (2006.01)
*F01D 5/14* (2006.01)
*F01D 5/18* (2006.01)
*F02C 3/04* (2006.01)

(52) U.S. Cl.
CPC ............... *F02C 3/32* (2013.01); *F01D 5/147* (2013.01); *F01D 5/18* (2013.01); *F01D 5/186* (2013.01); *F01D 5/187* (2013.01); *F02C 3/04* (2013.01); *F05D 2220/32* (2013.01); *F05D 2220/40* (2013.01); *Y02T 50/60* (2013.01)

(58) Field of Classification Search
CPC . F01D 5/147; F01D 5/18; F01D 5/186; F01D 5/187; F02C 3/04; F02C 3/34; Y02T 50/676
See application file for complete search history.

(56) References Cited

U.S. PATENT DOCUMENTS

| | | | | |
|---|---|---|---|---|
| 6,004,095 A | * | 12/1999 | Waitz | .................... F04D 29/667 415/115 |
| 2018/0045142 A1 | * | 2/2018 | Dierksmeier | ........... F42B 15/10 |

* cited by examiner

*Primary Examiner* — Arun Goyal (57) ABSTRACT

A fluid supercharging device (3, 5), comprising: a rotating shaft (7); a vane disc (308) coaxially fixed to the rotating shaft (7); a plurality of fan blades (301) fixed around a perimeter of the vane disc (308); the back side of the fan blades 301 being provided with at least one fluid guiding inlet (305), an end of the back side distal from the vane disc (308) is provided with a fluid guiding outlet (306, 307), a fluid channel (304) communicating the fluid guiding inlet (305) with the fluid guiding outlet (306, 307) is provided along a lengthwise direction inside the fan blades; the fan blades (301) rotate to generate a centrifugal force such that a fluid flows into the fluid channel via the fluid guiding inlet on the back side, and flows out of the fluid guiding outlet along the lengthwise direction of the fan blades.

7 Claims, 3 Drawing Sheets

ENGINE

CROSS-REFERENCE TO RELATED APPLICATIONS

This application is a continuation of U.S. patent application Ser. No. 15/800,394, filed on Nov. 1, 2017, is a divisional application of U.S. patent application Ser. No. 14/456,385, filed on Aug. 11, 2014, is a continuation-in-part of International Patent Application No. PCT/CN2013/071260 with an international filing date of Feb. 1, 2013, designating the United States, and further claims priority benefits to Chinese Patent Application No. 201210030149.5 filed Feb. 10, 2012. The contents of all of the aforementioned applications, including any intervening amendments thereto, are incorporated herein by reference.

TECHNICAL FIELD

The present invention relates to a power device, and in particular, to a fluid supercharging device and a turbine engine using the supercharging device.

BACKGROUND

The widely used turbine engine, for example, the turbine engine used in aircrafts, generally employs a compressor and a turbine having a multi-stage structure to increase the internal pressure within the engine, and implements combustion in cooperation with a combustion chamber, thereby jetting high-pressure fluid and generating a propelling force to push the aircraft to fly. At present, the pressure generated by the compressor and the turbine that operate under action of a driving force is not great, and the fuel fails to be fully combusted within the combustion chamber of the engine. Therefore, the generated propelling force is not great either. Accordingly, an improvement is desired.

SUMMARY

One objective of embodiments of the present invention is to provide a fluid supercharging device, comprising: a rotating shaft for rotating under action of a driving force; a vane disc coaxially fixed to the rotating shaft; a plurality of fan blades fixed around a perimeter of the vane disc; wherein: at least one of the fan blades employs a supercharging structure where a leeward side of the at least one of the fan blades is provided with at least one fluid guiding inlet, an end of the leeward side distal from the vane disc is provided with a fluid guiding outlet, a fluid channel communicating the fluid guiding inlet with the fluid guiding outlet is provided along a lengthwise direction inside the fan blades; the fan blades rotate to generate a centrifugal force such that a fluid flows into the fluid channel via the fluid guiding inlet on the leeward side, and flows out of the fluid guiding outlet along the lengthwise direction of the fan blades, the fluid flows along different paths between a windward side and the leeward side of the fan blades in different flow velocities to generate a pressure difference.

Another objective of embodiments of the present invention is to provide another fluid supercharging device, comprising: a rotating shaft for rotating under a driving force; a vane disc coaxially fixed to the rotating shaft; a plurality of fan blades fixed around a perimeter of the vane disc; wherein: at least one of the fan blades employs a supercharging structure where a leeward side of the at least one of the fan blades is provided with at least one fluid guiding inlet, and a fluid channel in communication with the fluid guiding inlet is provided along a lengthwise direction inside the fan blades; the supercharging device further comprising a suction motor, wherein a gas intake of the suction motor is in communication with the fluid channel and operable to extract gas stream under action of a driving force, such that a fluid flows into the fluid channel via the fluid guiding inlet on the leeward side and generates an accelerated flow velocity within the fluid channel Still another objective of embodiments of the present invention is to provide A turbine engine, comprising: a housing, the housing being of a hollow cylindrical shape, a front portion of the housing being provided with a gas intake passage, a rear portion thereof being provided with a jetting port, an inner portion thereof being provided with a combustion chamber; a compressor and a turbine that are formed by a multi-stage vane disc and a plurality of fan blades being coaxially coupled to a rotating shaft, the plurality of fan blades being fixed around a perimeter of the vane disc; wherein: at least one of the fan blades employs a supercharging structure where a leeward side of the at least one of the fan blades is provided with at least one fluid guiding inlet, and a fluid channel in communication with the fluid guiding inlet and a fluid guiding outlet is provided along a lengthwise direction inside the fan blades; the supercharging device further comprising a suction motor, wherein a gas intake of the suction motor is in communication with the fluid guiding outlet of the fluid channel and operable to extract gas stream under action of a driving force, such that a fluid flows into the fluid channel via the fluid guiding inlet on the leeward side and generates an accelerated flow velocity within the fluid channel.

Yet still another objective of embodiments of the present invention is to provide an engine, comprising: a housing, the housing being of a hollow cylindrical shape, a front portion of the housing being provided with a gas intake passage, a rear portion thereof being provided with a jetting port, an inner portion thereof being provided with a combustion chamber; a compressor and/or a turbine being provided coaxially with a rotating shaft and received in the housing; wherein: a rear portion of the compressor is provided, coaxially with the rotating shaft, with a hollow rotating cylinder with a higher rotation velocity, the hollow rotating cylinder being received in the combustion chamber, such that fuel in the combustion chamber is fully combusted with extension of a fluid flowing path as the hollow rotating cylinder rotates.

The embodiments of the present invention achieve the following beneficial effects: When the fan blades of the supercharging device of the engine rotates at a high velocity, a great centrifugal force is generated, which throws the fluid at the center to the surrounding. When the fluid flows around to the leeward side of the fan blades from the windward side of the fan blades along the outer shape, the fluid easily enters the fluid channel via the fluid guiding inlet. Under action of the centrifugal force, the fluid quickly passes through the fluid channel, and flows, through a guiding fluid at an end portion of the fan blades, out of the fluid guiding outlet and jetted backward, which is consistent with the direction of discharging fluid by the turbine engine, and collaboratively generates an even greater pushing force. In addition, two high-velocity fluid layers are formed. One is formed on the leeward side of the fan blades, and the other is formed inside the fluid channel, which form a pressure difference with the fluid layer on the fluid layer on the windward side of the of the fan blades due to different flow velocities. The pressure difference transfers from the windward side of the fan blades to the leeward side of the fan blades, thereby further increasing the pressure within the engine and generating an even greater propelling force.

DENOTATIONS OF REFERENCE SIGNS

1—housing; 2—front gas intake passage; 3—compressor; 4—combustion chamber; 5—turbine; 6—jetting port; 7—rotating shaft; 8—suction motor; 9—spoiler face;
101—front cylinder; 102—rear cylinder;
301—fan blade; 302—windward side; 303—leeward side; 304—fluid channel; 305—fluid guiding inlet; 306, 307—fluid guiding outlet; 308—vane disc; 309—central line;
401—nozzle;
601—front cylinder jetting port; 602—rear cylinder jetting port;
701—rotating shaft outer cover; 702—hollow rotating cylinder; 703—hollow rotating conical cylinder;
801—suction pipe; 802—rotating shaft inner channel; 803—gas outtake; 804—bearing structure;
902—double-layered channel; 903—lower-layer channel; 904—guiding fluid; 905—suction port.

DETAILED DESCRIPTION

Embodiment 1

Figure 1:
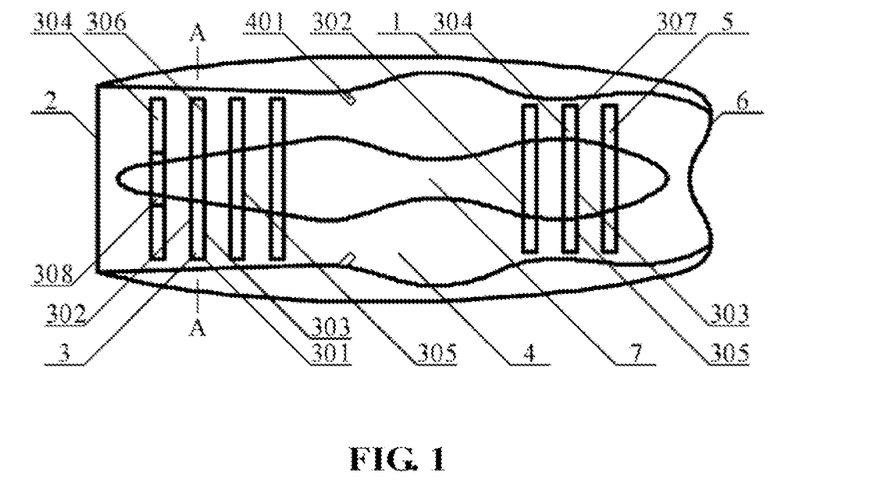
FIG. 1 is a schematic structural diagram of a supercharging device for a turbine engine according to an embodiment of the present invention.
Figure 2:
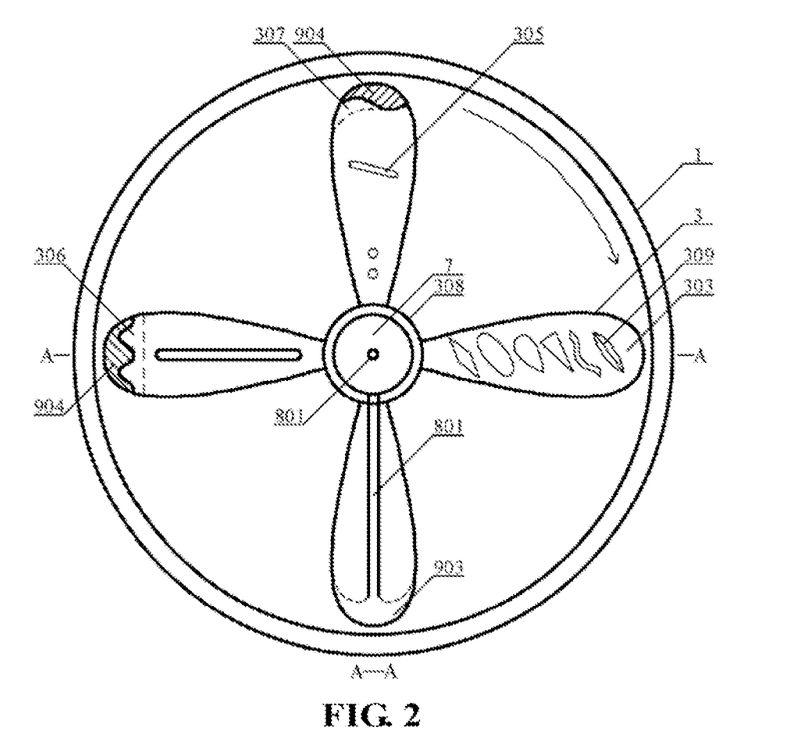
FIG. 2 is a cross-sectional view taken along the line A-A shown in FIG. 1.

With reference to FIG. 1 and FIG. 2, an embodiment of the present invention provides a fluid supercharging device for a turbine engine. The supercharging device comprises: a housing 1, a compressor 3, a combustion chamber 4, and a turbine 5. The compressor 3 and the turbine 5 both comprise a rotating shaft 7. An impeller structure is formed by a vane disc 308 and a plurality of fan blades 301 arranged around a perimeter thereof. In the embodiment of the present invention, the side of the fan blades 301 facing toward the fluid is a front side 302 (i.e., a windward side 302) and the side of the fan blades 301 backing on to the fluid is a back side 303 (i.e., a leeward side 303). For description brevity, unless otherwise specified, the impeller hereinafter refers to the vane disc. The rotating shaft 7 is operable to rotate under action of a driving force, the vane disc 308 is coaxially fixed to the rotating shaft 7, and the fan blades 301 are fixed to the perimeter of the van disc 308. For description brevity, unless otherwise specified, a supercharging structure of the compressor is also the supercharging structure of the turbine. At least one of the compressor 3 and the turbine 5 employs a structure of the fluid supercharging device according to the present invention. For example, in this embodiment, an example is given where: at least one fluid guiding inlet 305 is arranged along a lengthwise direction of leeward side housing of at least one of the fan blades 301, and a fluid guiding outlet 306, 307 is arranged on an end portion along of the lengthwise direction of the leeward side housing, i.e., an end portion distal from the vane disc 308, a fluid channel 304 communicating the fluid guiding inlet 305 with the fluid guiding outlet 306, 307 is provided along a lengthwise direction inside the fan blades, such that a fluid flows into the fluid channel via the fluid guiding inlet on the leeward side and length wisely passes though the fan blades to an end portion of the fan blades, and flows out of the fluid guiding outlet. It is preferable that a plurality of fluid guiding inlets 305 are arranged on an entire length, such that an even greater pressure difference is formed between the windward side and the leeward side. It is preferable that the space of the fluid channel 304 is as large as possible, such that more fluid on the leeward side flows through at a high velocity in the fluid channel under action of a centrifugal force, and generates an even greater pressure difference.

The housing 1 is of a hollow cylindrical shape, a front portion of the housing 1 is provided with a gas intake passage 2, and a rear portion thereof is provided with a jetting port 6. The combustion chamber 4 is formed by enclosure with inner space of the housing 1, and an inner wall of the housing 1 is provided with a nozzle 401 for jetting fuel. The compressor 3 and the turbine 5 are coaxially arranged, and received in the housing 1. A leeward side 303 of the compressor faces toward the jetting port 6 of the housing, a windward side of the turbine 5 faces toward the leeward side 303 of the compressor. To be specific, in the direction from the gas intake passage 2 to the jetting port 6, the compressor 3 and the turbine 5 are sequentially arranged along the rotating shaft 7. In an embodiment, the compressor 3 and/or the turbine 5 is of a multi-stage vane disc structure. Stages of vane discs are sequentially arranged coaxially, and the fan blades 301 fixed on each stage of vane disc 308 all employ the supercharging structure.

In this embodiment, the leeward side of the fan blades 301 is provided with a plurality of fluid guiding inlets 305 what are arranged along the lengthwise direction of the fan blades 301. The fluid guiding inlet 305 may be of a circle shape, an elongated shape, a rhombus shape, an ellipse shape, or an arc shape. In an embodiment, a central line of an opening-shape central line of the fluid guiding inlet 305 is consistent with rotation direction and angle of the fan blades 301, such that the fluid successfully enters the guiding inlet when the fan blades rotate. Further, the number and size of the fluid guiding inlets 305 decrease progressively along a direction distal from the vane disc 308, such that the fluid is guided into the fluid channel 304.

In this embodiment, the turbine engine and the supercharging device operate as follows: When the fan blades of the engine rotate at a high velocity, a greater centrifugal force is generated which pushes the central fluid all around; when the fluid flows from the windward side 302 of the fan blades 301 along the external shape thereof to the leeward side 303 of the fan blades 301, the fluid may easily enter the fluid channel 304 (especially when the central line of the opening-shape central line of the fluid guiding inlet 305 is consistent with rotation direction and angle of the fan blades 301, the fluid may more easily enter the guiding inlet).

Under action of the centrifugal force, the fluid quickly passes through the fluid channel 304, and flows, through an arc-shape guiding fluid at an end portion of the fan blades, out of the fluid guiding outlet 306, 307 and jetted backward, which is consistent with the direction of discharging fluid by the turbine engine, and collaboratively generates an even greater propelling force. In addition, the housing of the leeward side 303 of the fan blades 301 and the fluid channel 304 collaboratively form a fluid layer with inner and outer layers having a high motion velocity, which generates a pressure difference with a fluid layer on the windward side 302 of the fan blades 301 due to different flow velocities. If each stage of fan blade 301 of the compressor 3 employs such supercharging structure, the windward side 302 and the leeward side 301 of each stage of fan blade 301 generate a pressure difference therebetween. The pressure difference transfers stage-by-stage from the windward side 302 of the fan blades 301 to the leeward side 301 of the fan blades 301 to the combustion chamber 4. The pressure difference is a source of the propelling force, the pressure difference generated by the multiple stages of fan blades causes the pressure within the engine to increase, and thus the propelling force is increased. Meanwhile, stages of fan blades 301 of the compressor 3 also suction the fluid from the gas intake passage 2, and after compression, the compressor 3 discharges high-pressure fluid to enter the combustion chamber 4, the high-pressure fluid blends and combusts with the fuel jetted from the nozzle 401 in the combustion chamber 4, and the fluid is then suction by the multiple stages of fan blades due to the pressure difference generated by the supercharging device of the turbine 5, and re-compressed, and high-pressure and high-temperature glowing fluid is jetted from the jetting port 6 at a high velocity. This greatly improves the propelling force of an aircraft. The fluid channel in the multiple stages of fan blades in the turbine enlarges the combustion space in the combustion chamber, enable sufficient combustion of the fuel.

Generally the length of the fan blades 301 is greater than that the width thereof. Therefore, the path where the fluid flows through the fluid guiding inlet 305, the fluid channel 304, and the fluid guiding outlet 306, 307, is much larger than the path where the fluid flows through the width of the fan blade. Meanwhile, the direction along which the fluid flows through the fluid channel 304 is consistent with the centrifugal force. Therefore, under action of a traction force generated by the centrifugal force, the flow velocity of the fluid is sharply and instantly increased on the leeward side of the fan blades, which generate a pressure difference from the windward side of the fan blades due to different flow velocities. In this case, stages of fan blades 301 all stage-by-stage transfer backward the pressure differences thereof in descending order. This generates a great flow pressure within the engine. However, a traditional engine generates no fluid pressure difference, but only generates a propelling force after suctioning fluid, compressing the fluid, and then discharging the fluid. According to the present invention, the pressure difference, as another source of the propelling force, is proposed, which generates an even greater propelling force collaboratively with the fluid suction by the fan blades and then compressed.

According to the embodiment of the present invention, under action of the great propelling force, the fluid on the leeward side of the fan blades is changed from flowing through the widthwise direction to the lengthwise direction (flowing through the fluid guiding channel). In this way, the flow velocity of the fluid is increased, and a fluid pressure difference is generated, such that the pressure within the engine is improved. Therefore, the fluid jetted from the nozzle of the engine generates a propelling force greater than that generated by a traditional engine.

In the supercharging device according to the present invention, the windward side 302 and the leeward side 303 of the fan blades of each stage of vane disc 308 are subject to a pressure difference, and the plurality of fluid guiding inlets 305 arranged on the leeward side of each of the fan blades 301 are in communication with the fluid channel 304, achieving layer-by-layer coverage like bird's feather. Therefore, as fluid will not depart from the feather, the fluid will not depart from the housing of the fan blades 301, and the fluid pressure different is always present between the leeward and windward sides of the fan blades 301. This effectively prevents the surge phenomenon due to reverse expansion of high-pressure air at the rear portion, and greatly improves safety of the aircraft.

In another embodiment, the vane disc 308 of the compressor 3 and the turbine 5 of the supercharging device may be designed to one stage or multiple stages according to actual requirements. The number, size, and shape of fluid guiding inlets 305 on the leeward side 303 of each stage of fan blade 301 affect the volume and velocity of the fluid flowing through the surface thereof, and thus affect the pressure difference generated between the windward side 302 and the leeward side 303. Generally, different stages of vane discs of the conventional engine are driven at different velocities, i.e., coaxial but non-concentric. Therefore, the manufacture process is very complicated, and the safety and stability are poor. In the present invention, the pressure difference between different stages of fan blades may be controlled by arranging the fluid guiding inlets 305 of different quantities and shapes on different stages of fan blades 301, which is simpler, more convenient, suitable and safe over the conventional engine.

In another embodiment, the supercharging device may be provided for only the fan blades fixed on the last stage of vane disc distal from a gas intake direction, such that the low flow velocity and high gas pressure of the prior multiple stages of fan blades and the high flow velocity and low gas pressure of the last stage of fan blade form a fluid pressure difference therebetween, and thus collaboratively form an even larger forward-to-backward pressure difference transfer area. In this way, the engine generates an even greater propelling force.

In another embodiment, the compressor or turbine using the fan blades of at least one stage of vane disc of the fluid supercharging device, under driving of power, may also achieve a better supercharging effect, and generating a greater propelling force.

Further, as illustrated in FIG. 2, the fan blades of the stage of vane disc at the rear of the compressor or the turbine housing 1, and under driving of power, the supercharging device may also achieve a better supercharging effect, and generating a greater propelling force.

Further, the fluid supercharging device is also applicable to a power device in the water. For example, in the water, the fan blades around the perimeter of on stage of vane disc driven by the power device in the water, from the guiding inlet and the guiding outlet on the downstream face, are in communication with the inner fluid channel, such that under action of the centrifugal force, a propelling force is generated due to a pressure difference caused by different flow velocities between the upstream face and the downstream face. Further in cooperation with the original propelling force generated by suctioning and discharging water by the fan blades, an even greater propelling force is generated.

Further, as illustrated in FIG. 2, the vane disc 308 and the plurality of fan blades 301 arranged around the perimeter thereof, under driving of an external force, cause a further pressure difference to the supercharging device between inner and outer surfaces during rotation of the fan blades, wherein the external power comprises a wind force, a hydraulic force, a stream force, and a driving force capable of driving the fan blades to rotate. The pressure difference herein is a source of the propelling force. In this way, the fan blades rotate more quickly, which drives the vane disc 308. The vane disc drives the rotating shaft 7 coupled thereto to rotate more quickly. The rotating shaft 7 drives the power generator (not illustrated in the drawing) to generate more electricity.

Embodiment 2

Figure 3:
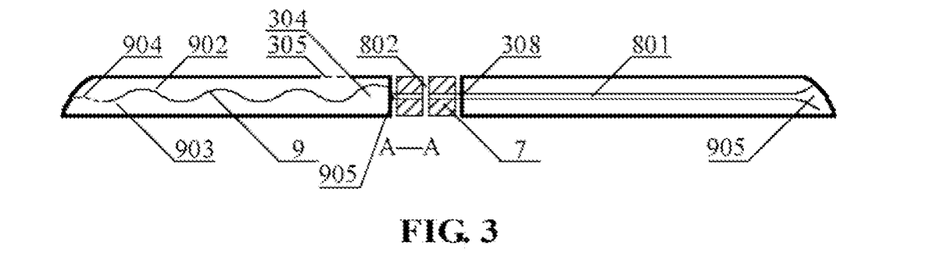
FIG. 3 is a cross-sectional view taken along the line A-A shown in FIG. 2.
Figure 4:
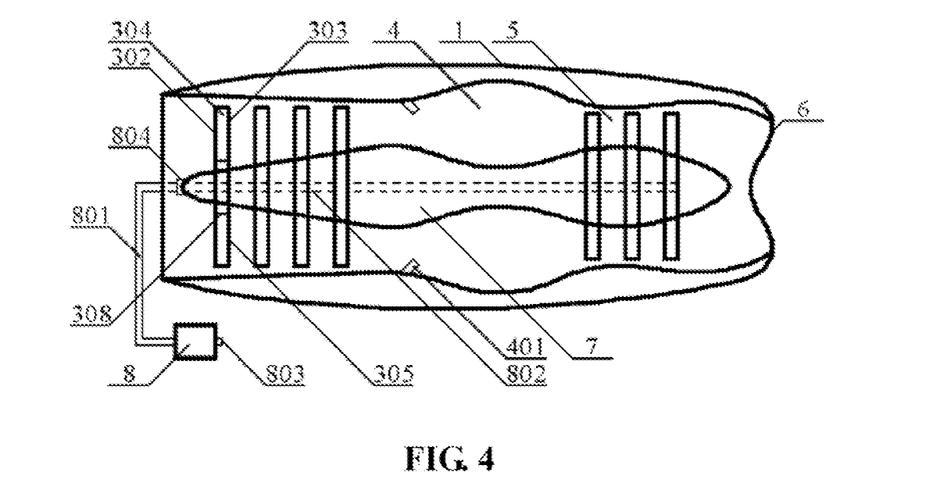
FIG. 4 is a schematic structural diagram of another supercharging device for a turbine engine according to an embodiment of the present invention.

FIG. 3 and FIG. 4 illustrate a turbine engine according to another embodiment of the present invention. In this embodiment, a suction motor 8 is only in communication with the fluid channel 304 within the fan blades of the compressor via a suction pipe 801 and a rotating shaft inner channel 802. Different from Embodiment 1, the fluid guiding outlet 306, 307 are closed, and the fluid entering the fluid channel 304 via the fluid guiding inlet 305 does not flow out from the fluid guiding outlet at an end portion of the fan blades but is extracted out by the suction motor 8. A suction port 905 of the suction motor 8 is in communication with the fluid channel 304, and is operable to extract the gas flow out under action of a driving force. The extremely great suction force enables the fluid to enter the fluid channel 304 at a high velocity from the plurality of fluid guiding inlets 305 on the leeward side of the fan blades, and increases the flow velocity within the fluid channel and the leeward side of the fan blades. The suction pipe 801 of the suction motor 8 is in communication to the channel 802 within the hollow rotating shaft 7 (for example, the suction pipe 801 is communicated to the rotating shaft inner channel 802 via a bearing structure 804), and thus is in communication with the fluid channel 304 and the plurality of fluid guiding inlets 305 on the leeward side of the fan blades 301.

In this embodiment, structures of the plurality of fluid guiding inlets and the multiple stages of fan blades similar to those in Embodiment 1 may also be used, which are thus not described herein any further.

In an embodiment, the suction motor 8 may be in communication with the fluid channel 304 using the following structure. As illustrated in the right part in FIG. 3, the suction motor may further comprise the suction pipe 801, wherein the suction port 905 of the suction pipe 801 is positioned at a top end where the fan blades 301 are distal from the vane disc 308 in the fluid channel, and is communication with the fluid guiding inlet 305 on the leeward side of the fan blades and the fluid channel 304 therein. The suction pipe 801 extends along a lengthwise direction of the fan blades 301 and is in communication with the rotating shaft inner channel 802, and further in communication with a gas intake of the suction motor 8. When the vane disc of the compressor 3 and the suction motor 8 simultaneously operate, the suction motor 8 generates a suction force to enable the fluid in the fluid guiding inlet 305 and the fluid channel 304 arrives at the end portion of the fan blades, is then suction into the suction pipe 801 via the suction port 905, and finally arrives to a gas outtake 803 via the rotating shaft inner channel 802. In this case, preferably the fluid discharged from the gas outlet 803 discharged into the gas intake passage 2 via a pipeline and thus reenters the engine (not illustrated in the drawing). Alternatively, according to the actual situation, if the suction volume is not great, a part of the fluid may be discharged outside from the gas outtake 803. In this case, the path along which the fluid on the leeward side of the fan blades flows is almost doubled, thereby forming three high-velocity fluid layers that are isolated from each other but in communication with each other. One layer is formed within the suction pipe, one layer is formed on the leeward side 303 of the fan blades 301, and the other layer is formed within the fluid channel 304. Similar to the analysis in Embodiment 1, due to the centrifugal force and difference of lengths of the paths along which the fluid flows, these high-velocity fluid layers generates a great flow velocity with the low velocity layer on the windward side, thereby generating an even greater pressure difference. In this way, the fluid pressure forward-to-backward transfers, generating an even greater propelling force.

In an embodiment, the suction motor 8 is arranged outside the turbine engine, and the suction port 803 thereof discharges the fluid extracted via the suction pipe 801 to the outside of the engine. With respect to use of an external suction motor, different models may be selected according to actual requirements. The power of the suction motor 8 may be increased to achieve a better suction effect.

In another embodiment, the suction pipe 801 may also employ a threaded pipe or a spiral pipe, to further enlarge the path along which the fluid flows, and improve the flow velocity. Similar to Embodiment 1, in this embodiment, the surface of the fan blades may not be subject to the drop-off phenomenon either.

In addition, by control of the suction motor, the present invention only consumes small energy of the suction motor and increases the flow velocity of the small-volume fluid within the fluid channel. Obviously, it may be easily ensured that the flow velocity on the leeward side of the fan blades is several times higher than that on the windward side. This generates a tens of times of fluid pressure difference between the front and rear surfaces of the fan blades. The pressure difference causes a propelling force, thereby causing the propelling force of the engine to improve drastically. Therefore, the number of stages of the vane disc within the engine may be correspondingly reduced; alternatively the suction motor is only in communication with the fluid channel within the last stage of vane disc of the compressor 3, which also cause greatly improves the propelling force of the engine.

In this embodiment, the flow velocity on the leeward side of the fan blades is increased by extracting air by the suction motor. This further increases the fluid pressure differential between the leeward side and the windward side, and provides basis for innovative development of various engines having a greater propelling force.

Embodiment 3

In another embodiment of the turbine engine of the present invention, the combustion chamber 4 may not be set. The suction pipe 801 of the suction motor 8 is in communication with the fluid channel of at least one stage of fan blades of the compressor 3 and the turbine 5. The design may follow the structure design in the above embodiments. A propelling force is generated by the pressure difference caused due to different flow velocities on the front and rear surfaces of the fan blades. This propelling force, together with the propelling force generated by the fan blades by suction and compressor air, enables a sufficient propelling force for the engine even without the combustion chamber 4. The pressure difference generated by the turbine shall not exceed that generated by the compressor, such that the fluid pressure transfers from a high level to a low level.

Embodiment 4

Figure 5:
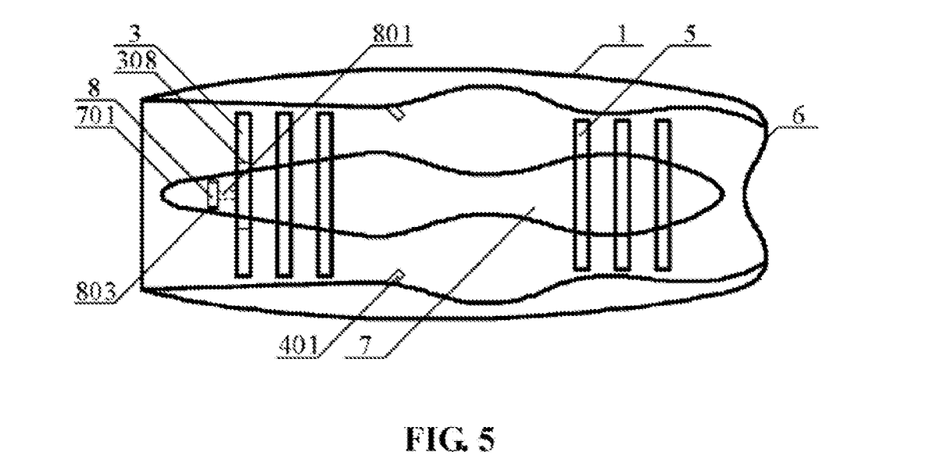
FIG. 5 is a schematic structural diagram of still another supercharging device for a turbine engine according to an embodiment of the present invention.

FIG. 3 and FIG. 5 illustrate a supercharging device of a turbine engine according to another embodiment of the present invention. In this embodiment, the suction motor 8 may be in communication with the fluid channel 304 using the following structure. As illustrated in the left part in FIG. 3, the fluid channel 304 is internally partitioned into to channels, i.e., a first channel 902 in communication with the fluid guiding inlet 305 and a second channel 903 in communication with the gas intake 905 of the suction motor 8. The first channel 902 is in communication with the second channel 903 at the end of the fan blades 301 distal from the vane disc 308. In an embodiment, an inner wall of the fluid channel 304 and/or a surface of the isolation layer is a spoiler face 9 along a long fluid flowing path, wherein the spoiler face 9 may be a concave-convex streamline shape, a wave shape, or a plurality of repeatedly arranged arc shapes. The first channel 902 and the second channel 903 may be upper and lower channels, or left and right channels, or two channels diagonally arranged within the fluid channel.

In an embodiment, the suction motor 8 may be disposed inside the turbine engine. As illustrated in FIG. 5, the suction motor 8 is coaxially arranged with the rotating shaft 7 of the engine but has a different rotation velocity from the engine. The rotation velocity of the suction motor 8 is greater than that of the rotating shaft. Specifically, the suction motor 8 may be disposed within a rotating shaft outer cover 701 at an end portion of the rotating shaft of the compressor, the suction motor is in communication with the fluid channel 304 within the fan blades 301 and within the rotating shaft inner channel 802 of the hollow rotating shaft 7 via the suction pipe 801, and discharges the suctioned fluid into the engine via the gas outtake 803.

Embodiment 5

Figure 6:
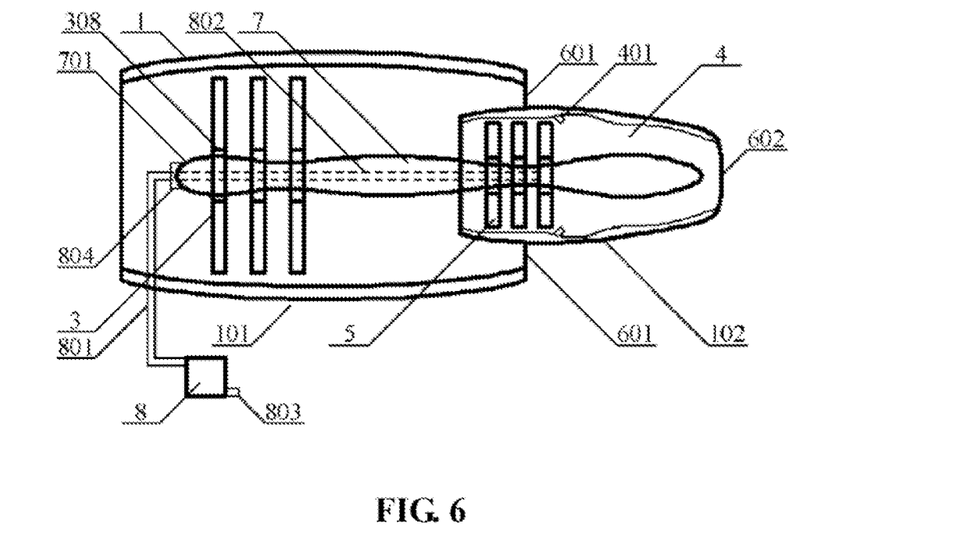
FIG. 6 is a schematic structural diagram of yet still another supercharging device for a turbine engine according to an embodiment of the present invention.

FIG. 6 illustrates a turbine engine according to another embodiment of the present invention. Different from the above embodiments, in this embodiment, the housing 1 comprises a front cylinder 101 and a rear cylinder 102 that are sequentially arranged along an axial direction, wherein a diameter of the front cylinder 101 is greater than that of the rear cylinder 102; the jetting port of the housing 1 comprises a rear jetting port 602 and an annular front jetting port 601 formed at a boundary of the front cylinder 101 and the rear cylinder 102; and the compressor 3 is received in the front cylinder 101 and the turbine 5 is received in the rear cylinder 101.

Stages of fan blades may employ the supercharging manner described in the above embodiments. For example, the suction pipe 801 is arranged in the fluid channel 304. According to the manner illustrated in FIG. 4, the suction pipe 801 is in communication with the external suction motor 8 via the rotating shaft inner channel 802 of the hollow rotating shaft 7.

When the engine and the motor simultaneously operate, the suction motor generates a great suction force, and under cooperation of the centrifugal force, suctions at a high velocity the fluid from the fluid guiding inlets 305 into the fluid channel 304, such that the fan blades within the front cylinder form a pressure difference due to different flow velocities. The high-pressure fluid discharged by the front cylinder is partitioned into two parts, wherein one part is jetted from the annular front jetting port 601 and the other part is suctioned by the turbine within the rear cylinder 102 and fully blends and combusts with the fuel in the combustion chamber 4. Finally, the high-velocity glowing fluid is jetted from the rear cylinder jetting port 602. The fluids jetted from the front cylinder jetting port 601 and the rear cylinder jetting port 602 pushes the aircraft to fly.

In an embodiment, in the multiple stages of fan blades in the front cylinder, the fluid guiding inlets may be only arranged on the last stage of fan blade, such that the prior stages of fan blades generate a high pressure due to low flow velocity, and transfers the pressure difference to low pressure generated by high flow velocity on the back surface of the last stage of fan blade, to generate an even greater propelling force.

In another embodiment, the suction motor 8 may not be employed, whereas the supercharging manner according to Embodiment 1 may be employed, that is, a fluid guiding outlet is arranged at an end portion of the fan blades. In this way, a pressure difference may be obtained, and in addition the area of the combustion chamber is enlarged, combustion efficiency is improved, and an even greater propelling force is generated, since the stages of fan blades of the turbine 5 have guiding inlets and guiding outlets in communication with the inner fluid channel.

In another embodiment, the combustion chamber may not be employed. Similar to Embodiment 3, a propelling force is generated by a pressure difference generated by the fan blades in the front and rear cylinders and a pressure generated by the fan blades by suctioning and compressing air.

In addition, according to the embodiment of the present invention, the supercharging device may also be applied to other types of engines, for example, a ramjet engine. The supercharging device according to the embodiment of the present invention is arranged in the ramjet engine, to generate a great fluid pressure, which enables the combustion chamber of the ramjet engine to generate high temperature and high pressure under a very high fluid pressure, thereby generating an even greater propelling force.

The present invention is an improvement and development of the conventional aircraft engine, and provides a novel, practical and feasible way for development of an engine with an even greater propelling force.

Embodiment 6

Figure 7:
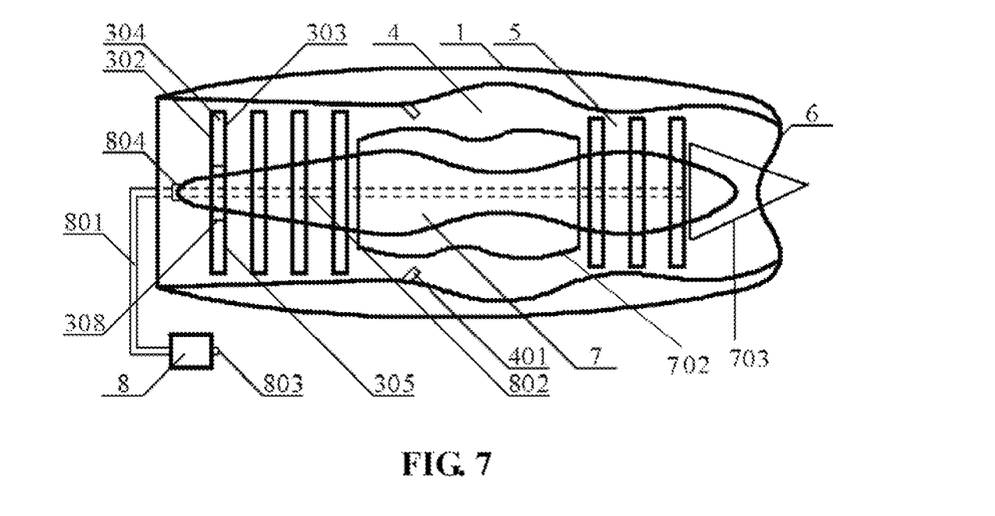
FIG. 7 is a schematic structural diagram of a hollow device in a combustion chamber of a turbine engine according to an embodiment of the present invention.

In the above embodiments, the fluid channel in the multiple stages of fan blades in the turbine enlarges the combustion space in the combustion chamber, enable sufficient combustion of the fuel. Referring to FIG. 7, different from the above embodiments, two arc-shape spoilers are arranged on the coaxial but non-concentric (conventional technique in the art) rotating shaft 7, the spoilers are left-to-right symmetrically coupled to the rotating shaft 7, thus forming a hollow rotating cylinder 702, which is arranged at a rear portion of the compressor 3 and received in the combustion chamber 4. A spiral structure on the outer surface of the two spoilers causes the hollow rotating cylinder to form a spiral shape during rotation. Therefore, when the fuel jetted by the nozzle 401 is combusted in the combustion chamber, since the hollow rotating cylinder 702 is very light, the load during the rotation is far less than that of the compressor, and thus the rotation velocity is very high. When rotating at a high velocity, the two arc-shape spoilers form an arc-shape body with the outer surface being of a spiral shape, and additionally a great centrifugal force is generated which throws the combusting fluid instantly from the center to all around. In this way, a hollow state is formed at the center of the hollow rotating cylinder. This state is favorable to combustion of the fuel around the rotating cylinder. Meanwhile, the spiral shape formed on the outer surface of the hollow rotating cylinder enables the combusting fluid to flow through circularly and repeatedly along an extended spiral path. During this high-velocity rotation, the long spiral-shape path and space which the high-temperature and high-pressure combusting fluid flow through enables sufficient combustion of the fuel. Obviously, the spiral path around the hollow rotating cylinder is several times longer than the path which the fluid in the combustion chamber 4 directly flows though. Even it is simple to increase the path by tens of times to enable sufficient combustion of the fuel. In other words, the combustion area of the combustion chamber is increased by tens of times. Only when the fuel is combusted sufficiently, the engine can obtain a greater propelling force.

According to the present invention, the space of the combustion chamber 4 of the engine is not yet enlarged; instead, an arc-shape spiral body is formed during the coaxial but non-concentric high-velocity rotation of the hollow rotating cylinder 702 arranged in the combustion chamber with the rotating shaft 7. During the high-velocity rotation of the hollow rotating cylinder, the fuel is sufficiently combusted by means of space and time obtained when the fuel flows through the extended path.

In this case, a hollow rotating conical cylinder 703 may also be arranged at the rear of the turbine 5. The hollow rotating conical cylinder 703 forms a triangle with two straight-line spoilers. The apex of the triangle extends from the cross-section of the jetting port 6 to the outside for a specific distance. When the triangle rotates at a high velocity, a cone is formed. The combusting fluid flows through the combustion chamber and the turbine, and then circularly flows through the spiral shape on the outer surface of the conical body repeatedly and concentrates at the cone tip of the con, i.e., the center of the cross-section of the jetting port 6 extending outside for a specific distance. In this way, the extension distance of the jetting port 6 to the outside is increased. In this state, the fluid flowing through the jetting port 6 concentrates at the central cone tip. That is, as the volume and temperature of the concentrated fluid at the center portion of the jetting port 6 are both greater than those of the surrounding, the fluid is jetted at a high velocity, thereby generating an even greater propelling force. The hollow rotating cone cylinder 703 rotates to form the cone tip of the cone, which may be also arranged within the jetting port 6.

The hollow rotating cylinder 702 and the hollow rotating conical cylinder 703 are all formed by two spoilers, or may be formed by more than two spoilers. A spiral shape is formed on the outer surface of the spoiler, and the hollow rotating cylinder 702 and the hollow rotating conical cylinder 703 formed by the inner and outer surfaces of the spoiler may simultaneously form a spiral shape. The inner surfaces of the more than two spoilers may be planar surfaces, and the outer surfaces thereof may be arc surfaces. The formed hollow rotating cylinder 702 and the hollow rotating conical cylinder 703 generate a pressure difference due to different flow velocities on the inner and outer surfaces of the spoiler during the rotation, thereby better throwing the fluid in the hollow rotating cylinder 702 and the hollow rotating conical cylinder 703 to the surrounding. The spoilers may be a plurality of arc lines or straight lines, which form the hollow rotating cylinder 702 or the hollow rotating conical cylinder 703 of different geometric shapes when rotating. For ease of understanding, the hollow rotating cylinder 702 and the hollow rotating conical cylinder 703 may also be, for example, a porous rotating cylinder. The difference lies in that during the rotation, the outer or inner surface of the hollow rotating cylinder 702 and the hollow rotating conical cylinder 703 forms a spiral shape. The path which the fluid in the hollow rotating cylinder 702 and the hollow rotating conical cylinder 703 flows through is preferably a spiral shape, which may also be formed in cooperation with a multi-section concave-convex shape outer or inner surface of the spoiler. In conclusion, the longer the path extended by the hollow rotating cylinder 702 and the hollow rotating conical cylinder 703 during the rotation, the more sufficient the combustion of the fuel.

In this embodiment, the hollow rotating cylinder may be implemented in cooperation with Embodiments 1 to 5. The supercharging device according to the present invention improves the pressure generated by the compressor and the turbine. Additionally, the hollow rotating cylinder enables sufficient combustion of the fuel in the combustion chamber. Therefore, in this case, the propelling force of the engine is significantly improved. The hollow rotating cylinder may also be arranged at the rear portion of the compressor and/or the turbine of a traditional engine.

According to this embodiment, the propelling force may be increased even with no power device being arranged in the combustion chamber.

In another embodiment, the combustion chamber 4 and the turbine 5 are removed. The hollow rotating cylinder 702 has a higher rotation velocity over at least one stage of compressor 3 arranged at the rear portion, and the fluid flows through a longer spiral-shape path around the hollow rotating cylinder. Therefore, the flow velocity is even higher, such that the compressor generates a pressure difference between the front and rear portions of the hollow rotating cylinder due to different flow velocities. The pressure difference is a source of the propelling force. This structure improves the propelling force of the power devices of various compressors with housings or without housings.

Similarly, the combustion chamber 3 and the compressor 3 are removed. The hollow rotating cylinder 702 has a higher rotation velocity over at least one stage of turbine 5 arranged at the rear portion, and the fluid flows through a longer path. Therefore, the flow velocity is even higher, such that the compressor generates a pressure difference between the front and rear portions due to different flow velocities. This structure improves the propelling force of the power devices of various compressors with housings or without housings.

It should be understood that the above embodiments are described only for illustrating the present invention, rather than for limiting the present invention. A person skilled in the art may make variations to the above embodiments according to the inventive concept of the present invention.

What is claimed is:

1. An engine, comprising:
    a housing (1), the housing being a hollow housing, a front portion of the housing (1) being a gas intake passage (2), a rear portion of the housing (1) being a jetting port (6), an inner portion of the housing (1) being provided with a combustion chamber (4), a compressor (3) and a turbine (5) being provided coaxially with a rotating shaft (7) and received in the housing (1);
    a hollow rotating cylinder (702) aft of a rear portion of the compressor (3) having a higher rotation velocity than of the compressor (3), wherein the hollow rotating cylinder (702) is provided coaxially but not concentrically with the rotating shaft (7), a pressure differential propelling force from the front portion to the rear portion being generated inside the housing (1) due to different flow velocities between the compressor (3) and the hollow rotating cylinder (702);

wherein the hollow rotating cylinder (702) is received in the combustion chamber (4) and is formed by at least two spoilers which is configured to allow the hollow rotating cylinder (702) during rotation to throw a fluid therein from an inside to an outside of the hollow rotating cylinder (702) to define a hollow state; and a fluid in the combustion chamber (4) is sufficiently combusted in the course of traveling on a longer path around the hollow rotating cylinder (702).

2. The engine according to claim 1, wherein the hollow rotating cylinder (702) formed by the at least two spoilers is much lighter than the compressor (3), which allows the hollow rotating cylinder (702) to rotate in a higher rotation velocity than of the compressor (3).

3. The engine according to claim 2, wherein the at least two spoilers are arc-shaped, straight line-shaped, concave-convex shaped, or spiral-shaped, and the hollow rotating cylinder (702) formed of the at least two spoilers causes the fluid to travel on the longer path formed around the hollow rotating cylinder (702) that is rotating at a high speed.

4. The engine according to claim 3, wherein the at least two spoilers each have an arc outer surface and a planar inner surface, such that the hollow rotating cylinder (702) formed by the at least two spoilers generates a pressure difference from an interior to an exterior due to different flow velocities on the inner surface and the outer surface;

wherein the pressure difference from the interior to the exterior throws the fluid inside the hollow rotating cylinder (702) to the outside, such that the fluid in the combustion chamber (4) is sufficiently combusted in the course of traveling on the path around the hollow rotating cylinder (702).

5. The engine according to claim 3, further comprising: a hollow rotating conical cylinder (703) with a higher rotation velocity coaxially provided at a rear of the turbine (5), wherein a pressure differential propelling force from front of the turbine to the rear is generated between the turbine (5) and the hollow rotating conical cylinder (703) due to different flow velocities.

6. The engine according to claim 5, wherein the hollow rotating conical cylinder (703) is formed by a porous cylinder.

7. The engine according to claim 1, wherein the hollow rotating cylinder (702) is formed by a porous cylinder.

* * * * *